United States Patent
Chiang

(10) Patent No.: US 10,633,123 B2
(45) Date of Patent: Apr. 28, 2020

(54) EXOSKELETAL LAUNCH SUPPORT STRUCTURE

(71) Applicant: Space Systems/Loral, LLC, Palo Alto, CA (US)

(72) Inventor: Jason Chiang, Fremont, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 467 days.

(21) Appl. No.: 15/480,276

(22) Filed: Apr. 5, 2017

(65) Prior Publication Data

US 2018/0290771 A1 Oct. 11, 2018

(51) Int. Cl.
*B64G 1/64* (2006.01)
*B64G 1/00* (2006.01)
*B64G 1/40* (2006.01)

(52) U.S. Cl.
CPC .............. *B64G 1/645* (2013.01); *B64G 1/002* (2013.01); *B64G 1/641* (2013.01); *B64G 1/401* (2013.01); *B64G 1/403* (2013.01); *B64G 1/405* (2013.01); *B64G 2001/643* (2013.01)

(58) Field of Classification Search
CPC ........ B64G 1/645; B64G 1/002; B64G 1/641; B64G 1/401; B64G 1/403; B64G 1/405; B64G 2001/643
See application file for complete search history.

(56) References Cited

U.S. PATENT DOCUMENTS

| | | | |
|---|---|---|---|
| 3,386,745 A | 6/1968 | Hein | |
| 3,665,670 A | 5/1972 | Rummler | |
| 3,847,694 A | 11/1974 | Stewing | |

(Continued)

FOREIGN PATENT DOCUMENTS

| | | |
|---|---|---|
| CN | 102867101 A | 1/2013 |
| CN | 103412997 A | 11/2013 |

(Continued)

OTHER PUBLICATIONS

U.S. Office Action dated Feb. 8, 2018 issued in U.S. Appl. No. 15/053,993.

(Continued)

*Primary Examiner* — Assres H Woldemaryam
(74) *Attorney, Agent, or Firm* — Weaver Austin Villeneuve & Sampson LLP

(57) ABSTRACT

A spacecraft includes payload equipment and bus equipment, each of the payload equipment and the bus equipment being coupled with a secondary structure arrangement. The spacecraft is configured to structurally interface with a launch vehicle upper stage only by way of an exoskeletal launch support structure (ELSS) that provides a first load path between a launch vehicle upper stage and the secondary structure arrangement. The spacecraft is configured to deploy from the launch vehicle upper stage by separating from the ELSS. In some implementations, the first load path is the only load path between the spacecraft and the launch vehicle upper stage, and substantially all of the ELSS remains with the launch vehicle upper stage. Because the secondary structure may be substantially less massy then the ELSS, subsequent orbit raising maneuvers may then be executed with a spacecraft having a reduced dry mass.

15 Claims, 7 Drawing Sheets

(56) References Cited

U.S. PATENT DOCUMENTS

| | | | |
|---|---|---|---|
| 3,920,268 A | 11/1975 | Stewing | |
| 4,084,827 A | 4/1978 | Wolf | |
| 4,211,259 A | 7/1980 | Butler | |
| 4,213,619 A | 7/1980 | Arlt et al. | |
| 4,395,004 A | 7/1983 | Ganssle | |
| 4,451,017 A * | 5/1984 | Marshall | B64G 1/002 244/172.2 |
| 4,527,362 A | 7/1985 | Tobey et al. | |
| 4,612,750 A | 9/1986 | Maistre | |
| 4,624,599 A | 11/1986 | Piasecki | |
| 4,637,193 A | 1/1987 | Lange | |
| 4,697,767 A | 10/1987 | Witten et al. | |
| 4,801,159 A | 1/1989 | Sehorn | |
| 4,982,546 A | 1/1991 | Lange | |
| 5,094,409 A * | 3/1992 | King | B64G 1/60 244/159.6 |
| 5,244,170 A * | 9/1993 | Shekher | B64G 1/641 244/118.1 |
| 5,294,078 A * | 3/1994 | Gurr | B64G 5/00 244/116 |
| 5,613,653 A | 3/1997 | Bombled et al. | |
| 5,666,128 A * | 9/1997 | Murray | H01Q 1/288 343/705 |
| 5,667,167 A * | 9/1997 | Kistler | B64G 1/002 244/110 E |
| 5,732,765 A | 3/1998 | Drolen et al. | |
| 5,735,489 A | 4/1998 | Drolen et al. | |
| 5,743,325 A | 4/1998 | Esposto | |
| 5,787,969 A | 8/1998 | Drolen et al. | |
| 5,806,800 A | 9/1998 | Caplin | |
| 5,806,803 A | 9/1998 | Watts | |
| 5,839,696 A | 11/1998 | Caplin et al. | |
| 5,961,078 A * | 10/1999 | Edberg | F16F 15/02 244/173.2 |
| 6,053,454 A * | 4/2000 | Smolik | B64G 1/10 244/173.1 |
| 6,138,951 A | 10/2000 | Budris et al. | |
| 6,296,206 B1 | 10/2001 | Chamness et al. | |
| 6,513,760 B1 * | 2/2003 | Mueller | B64G 1/002 244/171.1 |
| 7,090,171 B2 * | 8/2006 | Peck | B64G 1/002 244/173.2 |
| 7,513,462 B1 | 4/2009 | McKinnon et al. | |
| 7,922,179 B2 | 4/2011 | Andrick et al. | |
| 8,126,684 B2 | 2/2012 | Goel et al. | |
| 8,784,998 B2 | 7/2014 | Cap et al. | |
| 8,820,684 B2 | 9/2014 | McKinnon et al. | |
| 8,855,977 B2 | 10/2014 | Hallquist | |
| 8,915,472 B2 | 12/2014 | Aston et al. | |
| 8,967,547 B2 | 3/2015 | Wong et al. | |
| 9,273,634 B2 * | 3/2016 | Bahn | B64G 1/40 |
| 9,352,856 B1 | 5/2016 | Wu | |
| 9,512,949 B2 | 12/2016 | Kauppi et al. | |
| 9,889,951 B1 | 2/2018 | Wong et al. | |
| 10,059,472 B2 * | 8/2018 | Yaney | B64G 5/00 |
| 10,112,731 B2 | 10/2018 | Rodrigues et al. | |
| 10,227,145 B2 | 3/2019 | Hijmans et al. | |
| 10,407,189 B1 | 9/2019 | Freestone et al. | |
| 2002/0149540 A1 * | 10/2002 | Munder | H01Q 1/08 343/915 |
| 2003/0216894 A1 | 11/2003 | Ghaboussi et al. | |
| 2004/0128940 A1 | 7/2004 | LaForge | |
| 2005/0126106 A1 | 6/2005 | Murphy et al. | |
| 2006/0016935 A1 * | 1/2006 | Jordan | B64G 1/10 244/159.4 |
| 2008/0078886 A1 | 4/2008 | Foster et al. | |
| 2008/0300831 A1 | 12/2008 | Taggart et al. | |
| 2010/0005752 A1 | 1/2010 | Hawkins et al. | |
| 2011/0108090 A1 | 5/2011 | Lance et al. | |
| 2012/0215498 A1 | 8/2012 | Hallquist | |
| 2013/0185030 A1 | 7/2013 | Hallquist | |
| 2013/0232907 A1 | 9/2013 | Jones, III | |
| 2014/0239125 A1 | 8/2014 | Aston et al. | |
| 2014/0252744 A1 | 9/2014 | D'Aluisio | |
| 2015/0102174 A1 | 4/2015 | Chu | |
| 2015/0232205 A1 * | 8/2015 | Lively | B64G 1/002 244/2 |
| 2015/0353211 A1 * | 12/2015 | London | B64G 1/645 244/173.3 |
| 2016/0016229 A1 | 1/2016 | Czinger et al. | |
| 2016/0251093 A1 | 9/2016 | Hijmans et al. | |
| 2016/0253444 A1 | 9/2016 | Rodrigues et al. | |
| 2016/0264264 A1 * | 9/2016 | Helmer | B64G 1/222 |
| 2016/0318635 A1 * | 11/2016 | Field | B64G 1/641 |
| 2017/0036782 A1 * | 2/2017 | Dula | B64G 1/403 |

FOREIGN PATENT DOCUMENTS

| | | |
|---|---|---|
| CN | 103863577 A | 6/2014 |
| WO | WO 2015/175892 A1 | 11/2015 |

OTHER PUBLICATIONS

U.S. Notice of Allowance dated Jun. 29, 2018 issued in U.S. Appl. No. 15/053,993.
U.S. Office Action dated Aug. 24, 2017 issued in U.S. Appl. No. 15/053,998.
U.S. Final Office Action dated Mar. 8, 2018 issued in U.S. Appl. No. 15/053,998.
U.S. Office Action dated Jul. 2, 2018 issued in U.S. Appl. No. 15/053,998.
U.S. Notice of Allowance dated Oct. 31, 2018 issued in U.S. Appl. No. 15/053,998.
International Search Report and Written Opinion dated Jun. 1, 2016 issued in PCT/US2016/019855.
International Preliminary Report on Patentability dated Sep. 8, 2017 issued in PCT/US2016/019855.
European Extended Search Report dated Aug. 2, 2018 issued in EP 18162501.3.
Czinger, et al. [US Provisional Patent Application filed Jul. 2, 2014] entitled "Systems and Methods for Fabricating Joint Members" [WSGRDocketNo. 46517702.1011].
ATK An Advanced Weapon and Space Systems Company, "CCAT ATK Composite Strut Study Final Report," Dec. 13, 2010, 69 pages.
Kohta et al., "A design method for optimal truss structures with certain redundancy C3. based on combinatorial rigidity theory," 1Oth World Congress on Structural and Multidisciplinary Optimization, May 19-24, 2013, Orlando, FL., 10 pages.
Li et al., "Truss topology optimization with species conserving genetic algorithm," IEEE, 2014, 7 pages.
Matsuo, et al. "Optimization of elastically deformed gridshell with partially released joints," International Association for Shell and Spatial Structures (IASS), Apr. 2015, Tokyo, Japan, 7 pages.
U.S. Office Action dated Oct. 16, 2018 issued in U.S. Appl. No. 15/336,541.
U.S. Notice of Allowance dated Feb. 27, 2019 issued in U.S. Appl. No. 15/336,541.
U.S. Appl. No. 15/336,541, filed Oct. 27, 2016, Freestone et al.
U.S. Notice of Allowance dated May 1, 2019 issued in U.S. Appl. No. 15/336,541.
European Office Action dated Feb. 6, 2020 issued in EP 18162501.3.

* cited by examiner

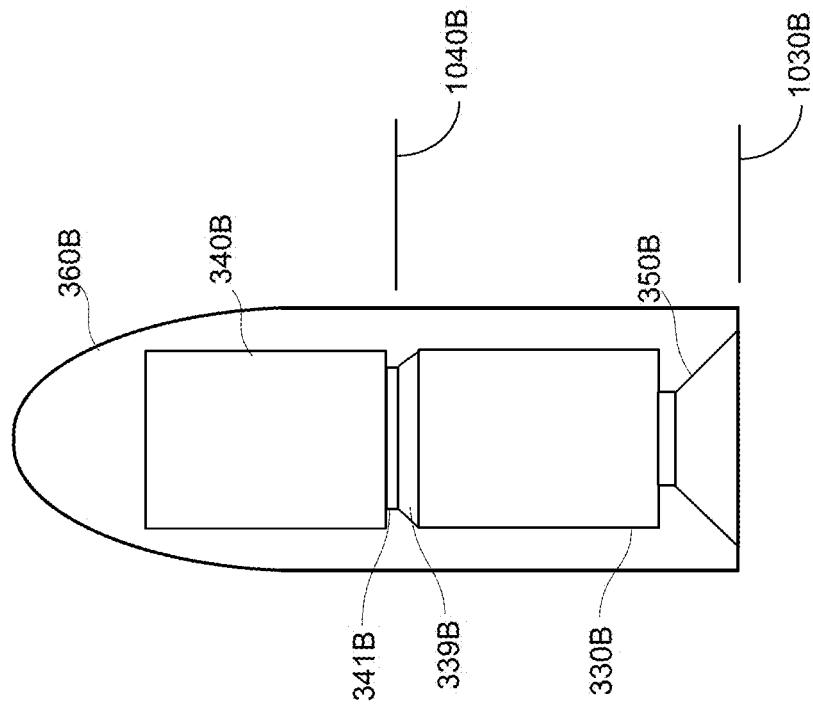
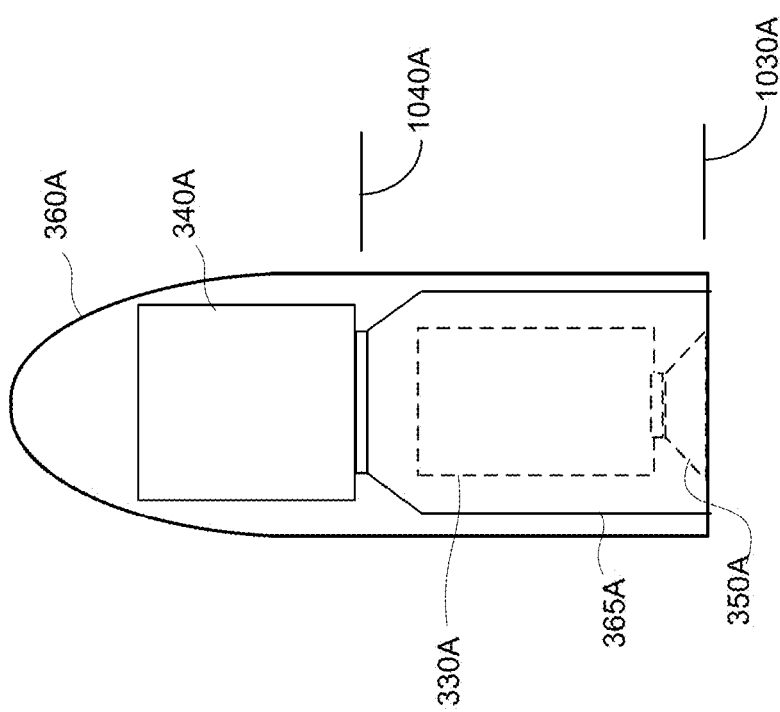

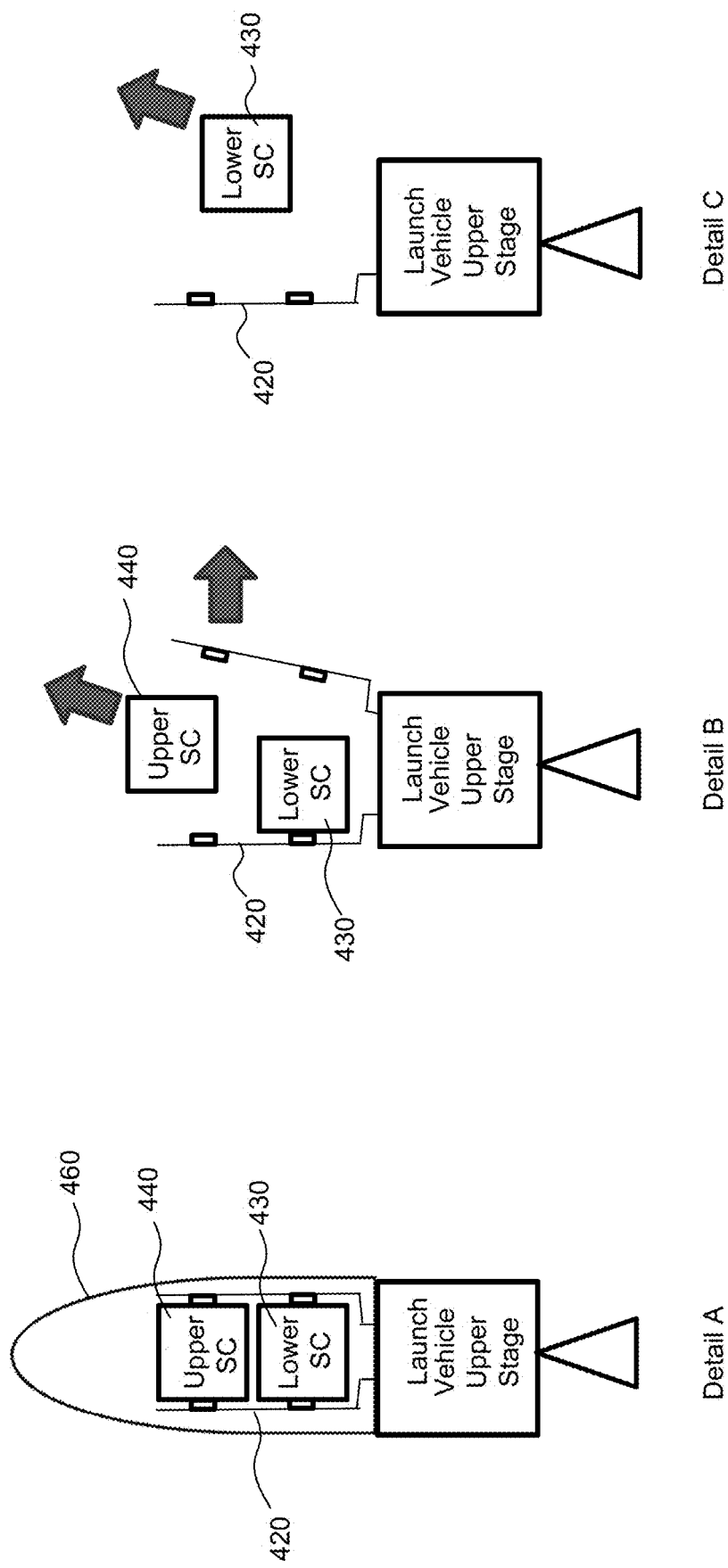

EXOSKELETAL LAUNCH SUPPORT STRUCTURE

TECHNICAL FIELD

This invention relates generally to a launch support structure for a spacecraft, and more particularly to an exoskeletal structure for one or more spacecraft that is configured to interface between the spacecraft and a launch vehicle payload adapter.

BACKGROUND

The assignee of the present invention manufactures and deploys spacecraft for, inter alia, communications and broadcast services from geosynchronous orbit, for example. Such spacecraft are commonly delivered to an initial non-operational ("parking" or "transfer") orbit by a launch vehicle. An on-board propulsion subsystem including chemical and/or electric thrusters included in the spacecraft is typically used to accomplish orbit raising from the non-operational orbit to the geosynchronous (or other higher altitude) orbit.

Spacecraft must be compatible with significant dynamic loads during launch, including acceleration, vibration and acoustic environmental loads. Primary structure to enable the spacecraft to safely withstand such loads may include internally disposed load-bearing components. For example, referring to FIG. 1, a spacecraft 100 includes a central cylinder 101 configured to interface, near an aft portion 101 of the spacecraft 100, with a payload adapter ring of a launch vehicle upper stage (not illustrated). Bus and payload equipment of the spacecraft 100, omitted for clarity of illustration, may be supported by the central cylinder 101 either directly, by way of struts (not illustrated) or structural panels, such as panels 102, 103, 104. It may be observed that the panels 102 and 103 are generally parallel with a spacecraft yaw (Z) and that panel 104 is disposed generally orthogonal to the Z axis. Any of panels 102, 103 and 104 may carry bus or payload equipment. Moreover, as illustrated, the panels 102, 103 and 104 may be coupled to externally facing equipment panels such as panel 106, disposed generally orthogonal to the pitch (Y) axis, and panel 107, disposed generally orthogonal to the Z axis. It will be appreciated that launch loads associated with the equipment panels and equipment mounted thereon are all carried by the central cylinder 101.

Launch costs represent a significant fraction of the mission cost of a typical satellite. Accordingly an improved spacecraft structural arrangement that enables an increase in the amount of payload mass deliverable to the operational orbit for a given launch mass is desirable.

SUMMARY

The presently disclosed techniques relate to a structural arrangement for one or more spacecraft that is configured to interface between the spacecraft and a launch vehicle payload adapter.

According to some implementations, a spacecraft includes payload equipment and bus equipment, each of the payload equipment and the bus equipment being coupled with a secondary structure arrangement. The spacecraft is configured to structurally interface with a launch vehicle upper stage only by way of an exoskeletal launch support structure that provides a first load path between a launch vehicle upper stage and the secondary structure arrangement. The spacecraft is configured to deploy from the launch vehicle upper stage by separating from the exoskeletal launch support structure.

In some examples, the exoskeletal launch support structure may include a first 3-D truss structure including at least four coupling nodes and at least six strut elements, attached together by a plurality of joints, each strut element disposed between and attached with a respective pair of the plurality of coupling nodes.

In some examples, the first load path may be the only load path between the spacecraft and the launch vehicle upper stage.

In some examples, separating from the exoskeletal launch support structure may result in substantially all of the exoskeletal launch support structure remaining with the launch vehicle upper stage. In some examples, the launch vehicle upper stage may be disposed in a first orbit and the spacecraft may include an on-board propulsion subsystem configured to accomplish orbit raising of only the spacecraft from the first orbit to a second orbit.

In some examples, the exoskeletal launch support structure may interface with the secondary structure arrangement at a plurality of mounting hard points.

In some examples, the secondary structure arrangement may include a 3-D truss structure configured to interface with the exoskeletal launch support structure.

According to some implementations, a system includes a payload including a plurality of spacecraft and a structural arrangement providing a first load path between a launch vehicle upper stage and the plurality of spacecraft. Each spacecraft is mechanically coupled with the launch vehicle upper stage only by the structural arrangement.

In some examples, each spacecraft may be configured to deploy from the launch vehicle upper stage by separating from the exoskeletal launch support structure. In some examples, separating from the exoskeletal launch support structure may result in substantially all of the exoskeletal launch support structure remaining with the launch vehicle upper stage. In some examples, the launch vehicle upper stage may be disposed in a first orbit and at least one of the plurality of spacecraft may include an on-board propulsion subsystem configured to accomplish orbit raising of the plurality of spacecraft from the first orbit to a second orbit. In some examples, the launch vehicle upper stage may be disposed in a first orbit; and each of the plurality of spacecraft may include a respective on-board propulsion subsystem configured to accomplish orbit raising of a respective spacecraft from the first orbit to a respective second orbit.

In some examples, the structural arrangement may include an exoskeletal launch support structure including a first 3-D truss structure including at least four coupling nodes and at least six strut elements, attached together by a plurality of joints, each strut element disposed between and attached with a respective pair of the plurality of coupling nodes. In some examples, each spacecraft may include a secondary structure, and the exoskeletal launch support structure may interfaces with the respective secondary structures at a plurality of mounting hard points. In some examples, at least one of the respective secondary structures may include a 3-D truss structure configured to interface with the exoskeletal launch support structure.

In some examples, the first load path may be the only load path between the plurality of spacecraft and the launch vehicle upper stage.

According to some implementations, a method for deploying a spacecraft from a launch vehicle upper stage disposed in a first orbit to a second orbit includes separating the spacecraft from an exoskeletal launch support structure and orbit raising the spacecraft from the first orbit to a respective second orbit. The spacecraft includes payload equipment and bus equipment, each of the payload equipment and the bus equipment being coupled with a secondary structure arrangement. The spacecraft is configured to structurally interface with the launch vehicle upper stage only by way of an exoskeletal launch support structure that provides a first load path between a launch vehicle upper stage and the secondary structure arrangement.

In some examples, separating from the exoskeletal launch support structure may result in substantially all of the exoskeletal launch support structure remaining with the launch vehicle upper stage.

In some examples, the exoskeletal launch support structure may include a first 3-D truss structure including at least four coupling nodes and at least six strut elements, attached together by a plurality of joints, each strut element disposed between and attached with a respective pair of the plurality of coupling nodes.

In some examples, the first load path may be the only load path between the spacecraft and the launch vehicle upper stage.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which:

FIGS. 3A and 3B illustrate two conventional techniques for configuring at least two spacecraft as a shared payload for a common launch vehicle.

FIG. 4 illustrates a launch configuration and deployment sequence according to an implementation.

DETAILED DESCRIPTION

Figure 1:
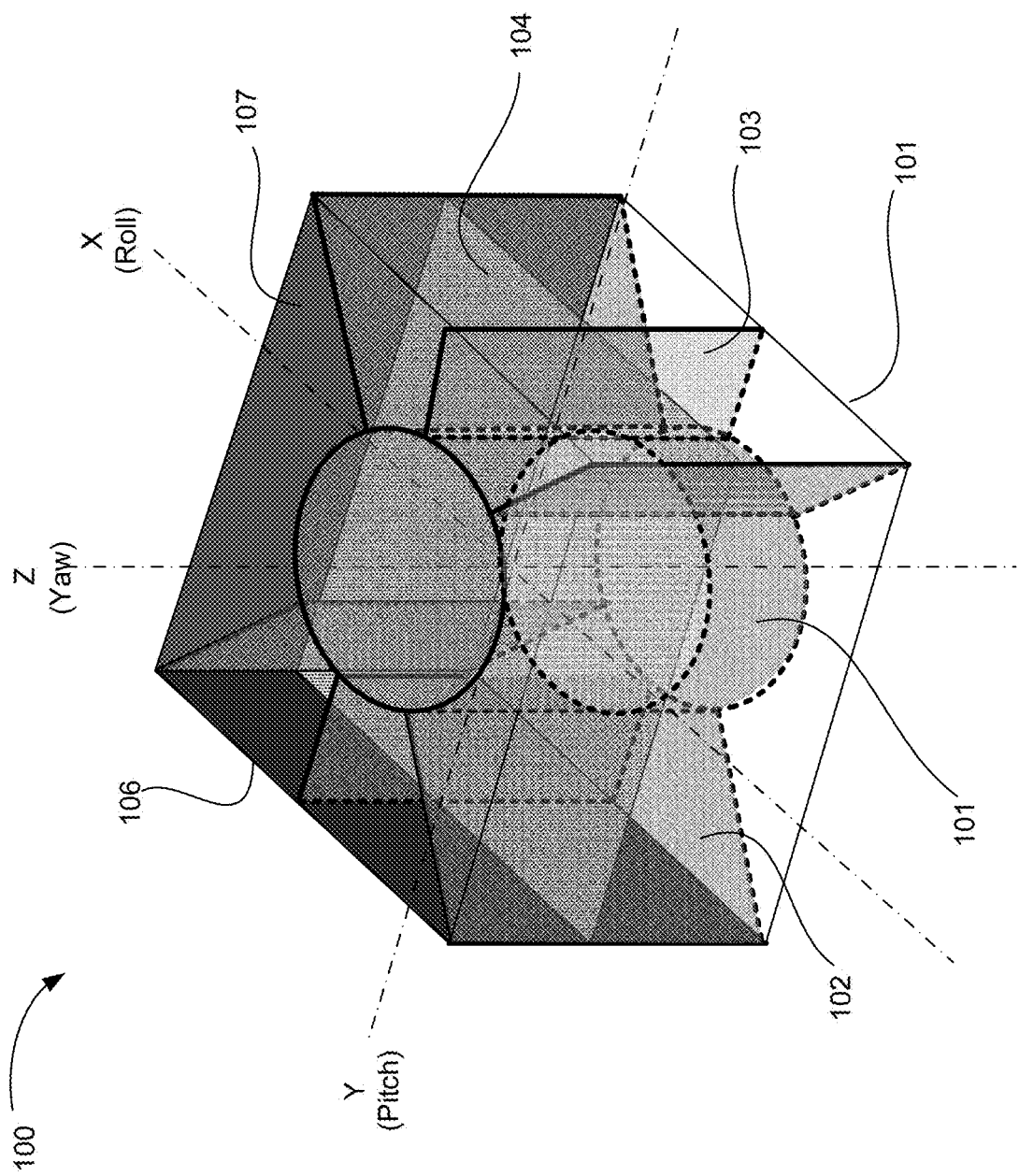
FIG. 1 shows an example of a spacecraft according to the prior art.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening feature s may be present. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The present disclosure contemplates an exoskeletal launch support structure (ELSS) that is designed to transmit launch loads from a spacecraft to a launch vehicle upper stage. When the spacecraft separates from the launch vehicle, the ELSS, advantageously, remains with the upper stage. The spacecraft includes payload equipment (e.g., antennas, transceivers, amplifiers, filters, etc.) and bus equipment (e.g., attitude control, thermal control, power, and propulsion subsystems) disposed on a secondary structure. The secondary structure may be substantially less massy then the ELSS. Subsequent orbit raising maneuvers may then be executed with a spacecraft having a lower dry mass than would be possible in the absence of the presently disclosed techniques.

The disclosed techniques may also avoid requiring any spacecraft in a "stack" of two or more spacecraft to carry launch loads associated with another spacecraft in the stack. Moreover, the ELSS may be configured as a truss-like frame structure that includes a number of coupling fittings ("coupling nodes" or "nodes") connected by strut elements.

The truss-like frame structure may incorporate features disclosed in U.S Pat. Pub. No. US 2016-0251093, US 2016-0253444 and/or Ser. No. 15/336,541, for example, which are assigned to the assignee of the present disclosure, and incorporated into the present application by reference in their entireties. The nodes may be formed by additive manufacturing and/or compression molding techniques, for example. The strut elements may include graphite tube members.

Advantageously, the spacecraft may also incorporate a secondary structure that incorporates a truss-like frame structure. Whether or not this is so, the secondary structure of the spacecraft may include coupling interfaces ("mounting hardpoints") with which the ELSS is structurally coupled. In some implementations, the secondary structure of the spacecraft and the ELSS are designed in parallel so as to minimize the launch mass. Because most or all of the launch loads are carried by the ELSS, and not the secondary structures of the spacecraft, the weight of the secondary structures may be substantially reduced.

Figure 2:
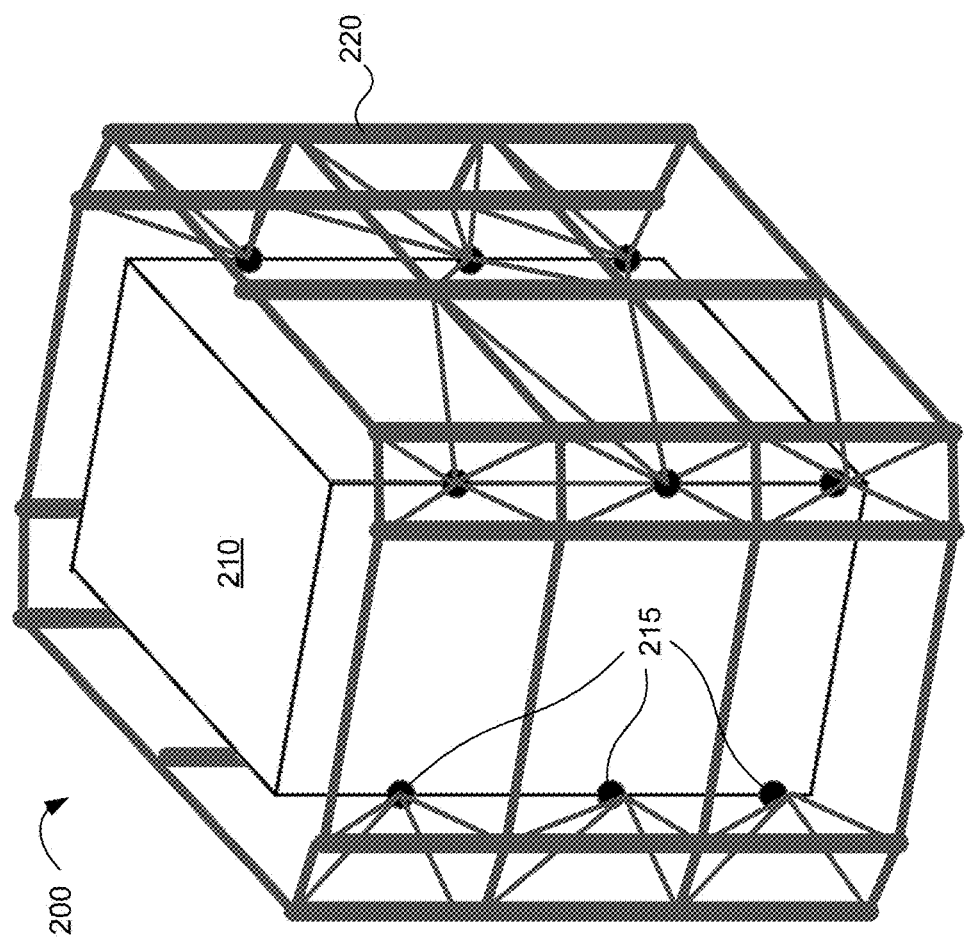
FIG. 2 illustrates an example of a spacecraft and an exoskeletal launch support structure (ELSS), according to an implementation.

FIG. 2 illustrates a spacecraft and ELSS, according to an implementation. An arrangement 200 includes the spacecraft 210 and ELSS 220 configured for launch. The spacecraft 210, depicted for clarity of illustration as a simple rectangular cuboid, may include payload equipment (not illustrated), bus equipment (not illustrated) and a secondary structure that includes mounting hardpoints 215 configured to provide a structural interface with the ELSS 220. In the illustrated implementation, the ELSS 220 is configured as a 3-D truss structure. The ELSS 220 is configured to provide the primary (and, advantageously, the only) load path between the spacecraft 210 and a launch vehicle upper stage (not illustrated). The ELSS 220 may be structurally coupled with the spacecraft 210 only by the mounting hardpoints 215. The mounting hardpoints 215 may be coupled with or included in the secondary structure.

Advantageously, the ELSS 220 may be structurally coupled with the mounting hardpoints by detachable couplings. Detachable couplings may include, for example, actuatable holddowns and release devices such that the spacecraft 210 may be separated from the ELSS 220 following launch. Advantageously, after separating the spacecraft 210 from the ELSS 220, substantially all of the ELSS 220 remains with the launch vehicle upper stage. As a result, orbit raising of the spacecraft 210 involves imparting a delta V only to the aggregate mass of the payload equipment, the bus equipment (including propellant) and the secondary structure. Because the secondary structure contemplated by the present disclosure is not a primary load path for launch loads, the secondary structure may be substantially lower mass than the conventional central cylinder arrangement described in connection with FIG. 1. As a result, an increase in the amount of payload mass deliverable to the operational orbit for a given launch mass is achieved.

The above described implementations relate to a spacecraft deployed on a dedicated launch vehicle (i.e., as the only payload carried by the launch vehicle). It is sometimes desirable, however, to configure "shared" payloads such that two or more spacecraft are carried into space by a common launch vehicle. FIGS. 3A and 3B illustrate two conventional techniques for configuring at least two spacecraft as a shared payload for a common launch vehicle. Referring first to FIG. 3A, a launch vehicle fairing 360A is illustrated as enclosing a lower spacecraft 330A and an upper spacecraft 340A. An aft structural adapter of the lower spacecraft 330A has a structural interface, proximal to station 1030A, with a foreword adapter structure 350A of a launch vehicle upper stage (not illustrated). The lower spacecraft 330A is enclosed by structural adapter 365A. The structural adapter 365A may be a SYLDA (SYstème de Lancement Double Ariane) carrier or similar arrangement, for example. Referring now to FIG. 3B, an alternative conventional arrangement is illustrated, wherein a launch vehicle fairing 360B encloses a lower spacecraft 330B and an upper spacecraft 340B. An aft structural adapter of the lower spacecraft 330B has a structural interface, proximal to station 1030B, with a foreword adapter structure 350B of a launch vehicle upper stage (not illustrated). An aft structural adapter 341B of the upper spacecraft 340B has a structural interface, proximal to station 1040B, with a foreword adapter structure 339B of the lower spacecraft 330B.

FIG. 4 illustrates a launch configuration and deployment sequence according to an implementation. Although FIG. 4 depicts two spacecraft, a lower spacecraft 430 and an upper spacecraft 440, three or more spacecraft are within the scope of the present disclosure. Referring first to Detail A, in a launch configuration, a launch vehicle fairing 460 encloses the lower spacecraft 430 and the upper spacecraft 440. Launch loads related to each of the lower spacecraft 430 and the upper spacecraft 440 are carried by an ELSS 420. The ELSS 420 may include a 3-D truss structure including at least four coupling nodes and at least six strut elements, attached together by a plurality of joints, each strut element disposed between and attached with a respective pair of the plurality of coupling nodes. The ELSS 420 may be configured such that launch loads are carried by structure elements of the ELSS and not, for example, by way of spacecraft-internal primary structures such as central cylinders and/or adapter rings.

Subsequent to jettisoning the fairing 460, and once the launch vehicle has achieved orbit, the ELSS 420 may be reconfigured to permit separation of a first spacecraft from the ELSS 420 (Detail B). In the illustrated implementation, the first spacecraft to be separated is the upper spacecraft 440, however it is contemplated that the spacecraft may be separated in any order.

The remaining spacecraft may be separated from the ELSS, sequentially or simultaneously. For example, as illustrated in Detail C, the lower spacecraft 430 may be separated from the ELSS 420 after separation of the spacecraft 440.

As described above in connection with FIG. 2, the ELSS 420 may be configured as a 3-D truss structure. The ELSS 420 may be configured to provide the primary (and, advantageously, the only) load path between each of the spacecraft 430 and the spacecraft 440 and the launch vehicle upper stage. The ELSS 420 may be structurally coupled with mounting hardpoints (not illustrated) disposed on each of the spacecraft 430 and the spacecraft 440 by detachable couplings. Detachable couplings may include, for example, actuatable holddowns and release devices. Advantageously, after separating the spacecraft 430 and the spacecraft 440 from the ELSS 420, substantially all of the ELSS 420 remains with the launch vehicle upper stage. As a result, orbit raising of the spacecraft 430 and the spacecraft 440 involves imparting a delta V only to the aggregate mass of the payload equipment, the bus equipment and the secondary structure.

Figure 5:
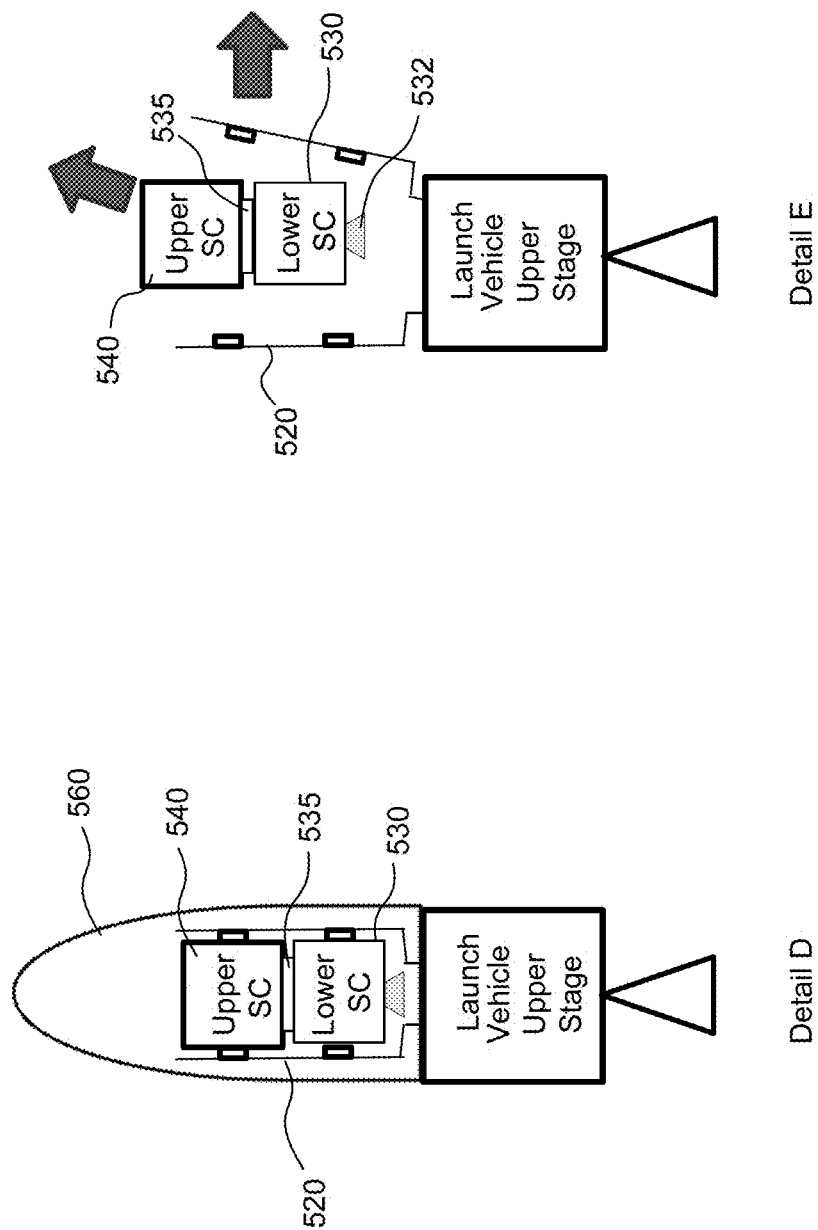
FIG. 5 illustrates a launch configuration and deployment sequence according to another implementation.

FIG. 5 illustrates a launch configuration and deployment sequence according to another implementation. Although FIG. 5 depicts two spacecraft, a lower spacecraft 530 and an upper spacecraft 540, three or more spacecraft are within the scope of the present disclosure. Referring first to Detail D, in a launch configuration, a launch vehicle fairing 560 encloses the lower spacecraft 530 and the upper spacecraft 540. In the illustrated implementation the lower spacecraft 530 includes a secondary payload adapter 535, with which the upper spacecraft 540 is mechanically coupled. Together, the lower spacecraft 530 the secondary payload adapter 535 and the upper spacecraft 540 may be referred to as a "stacked payload". Launch loads related to each of the lower spacecraft 530 and the upper spacecraft 540 are carried by an ELSS 520. As described above, the ELSS 420 may include a 3-D truss structure including at least four coupling nodes and at least six strut elements, attached together by a plurality of joints, each strut element disposed between and attached with a respective pair of the plurality of coupling nodes. The ELSS 520 may be configured such that launch loads are carried by structure elements of the ELSS 520 and not, for example, by way of spacecraft-internal primary structures such as central cylinders and/or adapter rings.

Figure 6:
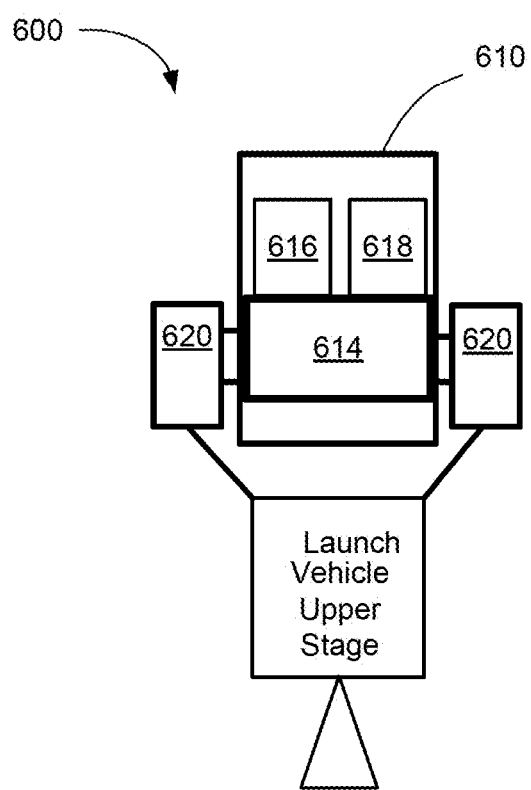
FIG. 6 illustrates a block diagram of a spacecraft and ELSS, according to an implementation.

Subsequent to jettisoning the fairing 560, and once the launch vehicle has achieved orbit, the ELSS 520 may be reconfigured to permit separation of the stacked payload from the ELSS 520 (Detail E). At least the lower spacecraft 530 includes an onboard propulsion subsystem including, for example, one or more thrusters 532. Although not illustrated, the upper satellite 540 may also include an onboard propulsion subsystem. The one or more thrusters 532 may include liquid or solid rocket engines and/or low thrust electric propulsion devices. The onboard propulsion subsystem of the lower satellite 530 may be configured to execute one or more orbit transfer maneuvers. For example, the on board propulsion subsystem of the lower satellite 530 may be configured to transfer the stack of the lower spacecraft 530 and the upper spacecraft 540 from a first orbit (e.g. a low earth orbit or a geosynchronous transfer orbit) to a second orbit. In some implementations, the upper spacecraft 540 may be separated from the lower spacecraft 530 after a certain amount of orbit transfer maneuvers have been performed. In some implementations, allocation of at least orbit transfer maneuver capabilities between the lower spacecraft 530 and the upper spacecraft 540 may be optimized, taking into account respective mission objectives of each satellite, using techniques described in U.S. Patent Publication No. 2016/0304219, assigned to the assignee of the present application and hereby incorporated by reference into the present application in its entirety for all purposes FIG. 6 illustrates a block diagram of a spacecraft and ELSS, according to an implementation. An arrangement 600 includes the spacecraft 610 and ELSS 620 together with a launch vehicle upper stage. The spacecraft 610 includes a secondary structure 614 which payload equipment 616 and bus equipment 618 may be coupled. The spacecraft 610 is configured to structurally interface with the launch vehicle upper stage only by way of the ELSS 620. As described hereinabove, spacecraft 610 may be configured to deploy from the launch vehicle upper stage by separating from the ELSS 620. Advantageously, the ELSS 620 may stay with launch vehicle upper stage is a nonoperational orbit, and subsequent orbit transfer maneuvers may then be executed with a spacecraft having a lower dry mass than would be possible in the absence of the presently disclosed techniques.

Figure 7:
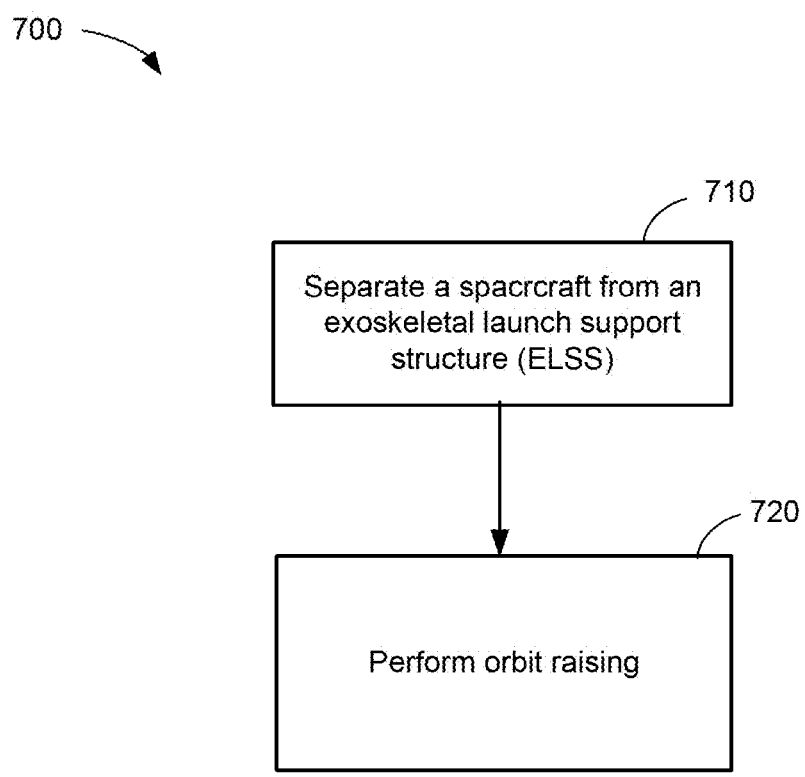
FIG. 7 illustrates an example of a method for deploying a spacecraft into a second orbit, from a launch vehicle upper stage disposed in a first orbit, according to an implementation.

Referring now to FIG. 7, a method 700 for deploying a spacecraft into a second orbit, from a launch vehicle upper stage disposed in a first orbit. The method 700 may begin, at block 710 with separating the spacecraft from an exoskeletal launch support structure.

At block 720, orbit raising may be performed such that the spacecraft transfers from the first orbit to the second orbit. As described hereinabove, the spacecraft may include payload equipment and bus equipment, each of the payload equipment and the bus equipment being coupled with a secondary structure arrangement. The spacecraft may be configured to structurally interface with the launch vehicle upper stage only by way of an exoskeletal launch support structure that provides a first load path between a launch vehicle upper stage and the secondary structure arrangement. Advantageously, separating from the exoskeletal launch support structure results in substantially all of the exoskeletal launch support structure remaining with the launch vehicle upper stage. As a result, orbit raising of the spacecraft involves imparting a delta V only to the aggregate mass of the payload equipment, the bus equipment and the secondary structure.

Thus, improved an improved spacecraft structural arrangement that enables an increase in the amount of payload mass deliverable to the operational orbit for a given launch mass has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A system comprising:
a spacecraft including payload equipment, bus equipment and a secondary structure arrangement, each of the payload equipment and the bus equipment being coupled with the secondary structure arrangement; and
an exoskeletal launch support structure that provides a primary load path between a launch vehicle upper stage and the secondary structure arrangement; wherein
the spacecraft is configured to structurally interface with the launch vehicle upper stage only by way of the exoskeletal launch support structure;
the spacecraft is configured to deploy from the launch vehicle upper stage by separating from the exoskeletal launch support structure;
the exoskeletal launch support structure includes a first 3-D truss structure including at least four coupling nodes and at least six strut elements, attached together by a plurality of joints, each strut element disposed between and attached with a respective pair of the plurality of coupling nodes; and
the primary load path is the only load path between the secondary structure arrangement and the launch vehicle upper stage.

2. The system of claim 1, wherein separating from the exoskeletal launch support structure results in substantially all of the exoskeletal launch support structure remaining with the launch vehicle upper stage.

3. The system of claim 2, wherein:
the launch vehicle upper stage is disposed in a first orbit; and
the spacecraft includes an on-board propulsion subsystem configured to accomplish orbit raising of only the spacecraft from the first orbit to a second orbit.

4. The system of claim 1, wherein the exo skeletal launch support structure interfaces with the secondary structure arrangement at a plurality of mounting hard points.

5. The system of claim 1, wherein the secondary structure arrangement includes a 3-D truss structure configured to interface with the exoskeletal launch support structure.

6. A system comprising:
a plurality of spacecraft configured as a payload of a launch vehicle, each spacecraft including a respective secondary structure arrangement; and
an exoskeletal launch support structure that provides a primary load path between an upper stage of the launch vehicle and the respective secondary structure arrangements; wherein
the exoskeletal launch support structure includes a first 3-D truss structure including at least four coupling nodes and at least six strut elements, attached together by a plurality of joints, each strut element disposed between and attached with a respective pair of the plurality of coupling nodes; and
the primary load path is the only load path between the secondary structure arrangements and the launch vehicle upper stage.

7. The system of claim 6, wherein each spacecraft is configured to deploy from the launch vehicle upper stage by separating from the exoskeletal launch support structure.

8. The system of claim 7, wherein separating from the exoskeletal launch support structure results in substantially all of the exoskeletal launch support structure remaining with the launch vehicle upper stage.

9. The system of claim 8, wherein
the launch vehicle upper stage is disposed in a first orbit; and
at least one of the plurality of spacecraft includes an on-board propulsion subsystem configured to accomplish orbit raising of the plurality of spacecraft from the first orbit to a second orbit.

10. The system of claim 8, wherein
the launch vehicle upper stage is disposed in a first orbit; and
each of the plurality of spacecraft includes a respective on-board propulsion subsystem configured to accomplish orbit raising of a respective spacecraft from the first orbit to a respective second orbit.

11. The system of claim 6, wherein the exoskeletal launch support structure interfaces with the respective secondary structures at a plurality of mounting hard points.

12. The system of claim 11, wherein at least one of the respective secondary structures includes a 3-D truss structure configured to interface with the exoskeletal launch support structure.

13. A method for deploying a spacecraft from a launch vehicle upper stage disposed in a first orbit to a second orbit, the method comprising:
- separating the spacecraft from an exoskeletal launch support structure; and
- orbit raising the spacecraft from the first orbit to a respective second orbit; wherein
  - the spacecraft includes payload equipment and bus equipment and a secondary structure arrangement, each of the payload equipment and the bus equipment being coupled with the secondary structure arrangement;
  - the exoskeletal launch support structure provides a primary load path between a launch vehicle upper stage and the secondary structure arrangement and
  - the spacecraft is configured to structurally interface with the launch vehicle upper stage only by way of the exoskeletal launch support structure; and
  - the primary load path is the only load path between the secondary structure arrangement and the launch vehicle upper stage.

14. The method of claim 13, wherein separating from the exoskeletal launch support structure results in substantially all of the exoskeletal launch support structure remaining with the launch vehicle upper stage.

15. The method of claim 13, wherein the exoskeletal launch support structure includes a first 3-D truss structure including at least four coupling nodes and at least six strut elements, attached together by a plurality of joints, each strut element disposed between and attached with a respective pair of the plurality of coupling nodes.

* * * * *